(12) United States Patent
Ouyang et al.

(10) Patent No.: US 11,131,893 B2
(45) Date of Patent: Sep. 28, 2021

(54) DISPLAY SUBSTRATE AND MANUFACTURING METHOD, REPAIRING METHOD THEREOF, AND DISPLAY APPARATUS

(71) Applicants: Beijing BOE Display Technology Co., Ltd., Beijing (CN); BOE Technology Group Co., Ltd., Beijing (CN)

(72) Inventors: Yi Ouyang, Beijing (CN); Bingyang Yu, Beijing (CN); Jinwei Zhu, Beijing (CN); Namin Kwon, Beijing (CN); Guibing Wang, Beijing (CN); Tongju Bai, Beijing (CN); Zhirui He, Beijing (CN); Bin Yang, Beijing (CN); Qun Liu, Beijing (CN); Guobin Xue, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/761,830

(22) PCT Filed: Nov. 12, 2019

(86) PCT No.: PCT/CN2019/117621
§ 371 (c)(1),
(2) Date: May 6, 2020

(87) PCT Pub. No.: WO2020/140618
PCT Pub. Date: Jul. 9, 2020

(65) Prior Publication Data
US 2021/0223649 A1    Jul. 22, 2021

(30) Foreign Application Priority Data
Jan. 3, 2019 (CN) .......................... 201910005155.7

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136259* (2013.01)

(58) Field of Classification Search
CPC ................... G02F 1/136259; G02F 1/136272
See application file for complete search history.

(56) References Cited

U.S. PATENT DOCUMENTS

2007/0284627 A1* 12/2007 Kimura ............. G02F 1/136286
257/257
2010/0296018 A1   11/2010 Kim et al.
(Continued)

FOREIGN PATENT DOCUMENTS

CN   202939397 U   5/2013
CN   103885262 A   6/2014
(Continued)

OTHER PUBLICATIONS

First office action of Chinese application No. 201910005155.7 dated May 8, 2020.
(Continued)

*Primary Examiner* — James A Dudek
(74) *Attorney, Agent, or Firm* — Fay Sharpe LLP

(57) ABSTRACT

Disclosed is a display substrate including a base substrate, and gate lines, data lines, common electrode lines and common electrodes on the base substrate; the gate lines and the data lines intersect to define pixel areas; the common electrodes are located in the pixel areas; the gate lines and the common electrode lines are alternately arranged one by one; each common electrode lines includes target wire segments and non-target wire segments, the target wire segments are wire segments where the common electrode
(Continued)

lines and the data lines intersect, and the non-target wire segments are wire segments on the common electrode line except the target wire segments; and for each common electrode line, a distance between any position point on the target wire segment and a target gate line is less than a distance between the non-target wire segment and the target gate line.

20 Claims, 11 Drawing Sheets

(56) References Cited

U.S. PATENT DOCUMENTS

2012/0112200 A1   5/2012   Nagano et al.
2018/0197883 A1   7/2018   Cheng
2018/0252969 A1   9/2018   Long et al.
2019/0181161 A1   6/2019   Li

FOREIGN PATENT DOCUMENTS

| CN | 104298034 A | 1/2015 |
| CN | 204925570 U | 12/2015 |
| CN | 206348571 U | 7/2017 |
| CN | 107230661 A | 10/2017 |
| CN | 206684444 U | 11/2017 |
| CN | 108287442 A | 7/2018 |
| CN | 109613772 A | 4/2019 |

OTHER PUBLICATIONS

International search report of PCT application No. PCT/CN2019/117621 dated Feb. 5, 2020.

* cited by examiner

| Determining a first repairing point and a second repairing point according to a breaking point of a first data line when the first data line is broken, wherein the first repairing point is an intersection point between a first common electrode line and the first data line, the second repairing point is an intersection point between a second common electrode line and the first data line, the first common electrode line and the second common electrode line are adjacent to each other and are sequentially arranged along a gate line scanning direction, and the breaking point is located between the first common electrode line and the second common electrode line | 901 |

↓

| Determining a plurality of cutting points according to the first repairing point and the second repairing point, wherein the plurality of cutting points includes: first cutting points on two first target wire segments, second cutting points on two second target wire segments, a third cutting point on a connection line between the first common electrode line and a first common electrode, and a fourth cutting point on a connection line between a third common electrode line and a second common electrode; the two first target wire segments are a target wire segment where the first data line and the first common electrode line intersect and a target wire segment where the first data line and the second common electrode line intersect, the two second target wire segments are a target wire segment where a second data line and the first common electrode line intersect and a target wire segment where the second data line the second common electrode line intersect; the second data line is a previous data line of the first data line; the first common electrode, a third common electrode and the second common electrode are adjacent to one another and are sequentially arranged in the same row along the gate line scanning direction; the third common electrode is located in a pixel area surrounded by a first gate line, a second gate line, the first data line and the second data line; the first gate line is a target gate line corresponding to the first common electrode line; the second gate line is a target gate line corresponding to the second common electrode line; and the second common electrode line and the third common electrode line are adjacent to each other and are sequentially arranged along the gate line scanning direction | 902 |

↓

| Connecting the first data line to the first common electrode line at the first repairing point, and connecting the first data line to the second common electrode line at the second repairing point | 903 |

↓

| Cutting corresponding common wires at each of the cutting points, the common wire including the first target wire segment, the second target wire segment and the connection line | 904 |

FIG. 9

DISPLAY SUBSTRATE AND MANUFACTURING METHOD, REPAIRING METHOD THEREOF, AND DISPLAY APPARATUS

CROSS-REFERENCE TO RELATED APPLICATION

The present application is a 371 of PCT/CN2019/117621, filed on Nov. 12, 2019, which claims priority to Chinese Patent Application No. 201910005155.7, filed on Jan. 3, 2019 and entitled "DISPLAY SUBSTRATE AND MANUFACTURING METHOD, REPAIRING METHOD THEREOF, AND DISPLAY APPARATUS", the entire contents of which are incorporated herein by reference.

TECHNICAL FIELD

The present disclosure relates to a display substrate and manufacturing method, repairing method thereof, and a display apparatus.

BACKGROUND

With continuous development of display technologies, display apparatuses are widely used in the display field. As a display substrate is a main display component of the display apparatus, the performance of the display substrate may directly affect the performance of the display apparatus.

SUMMARY

The present disclosure provides a display substrate and manufacturing method, repairing method thereof, and a display apparatus. The technical solutions are as follows:

In one aspect, a display substrate is provided. The display substrate includes:

a base substrate, and a plurality of gate lines, a plurality of data lines, a plurality of common electrode lines and a plurality of common electrodes on the base substrate, wherein the plurality of gate lines and the plurality of data lines intersect to define a plurality of pixel areas; the plurality of common electrodes are located in the plurality of pixel areas in a one-to-one correspondence; an extending direction of the plurality of gate lines is parallel to an extending direction of the plurality of common electrode lines, and the plurality of gate lines and the plurality of common electrode lines are alternately arranged one by one;

the common electrode line includes a plurality of target wire segments and non-target wire segments, each of the target wire segments is a wire segment where the common electrode line and one data line intersect, and the non-target wire segment is a wire segment on the common electrode line except the target wire segments; and for each of the common electrode lines, a distance between any position point on the target wire segment and a target gate line is less than a distance between the non-target wire segment and the target gate line, the target gate line being the gate line that is most proximal to the common electrode line, and common electrodes located on both sides of the target gate line and adjacent to the target gate line are connected to the common electrode line.

Optionally, for each of the common electrode lines, the target wire segment bends in a direction towards the target gate line.

Optionally, the target wire segment is an arc-shaped wire segment.

Optionally, the plurality of common electrodes are arranged in multiple rows along a data line scanning direction; and for each of the common electrode lines, the common electrode line is connected to a target common electrode, and is connected to a common electrode adjacent to and located in the same row as the target common electrode by a bridging line crossing over the target gate line, and the target common electrode and the common electrode line are located in the same pixel area.

Optionally, in two gate lines adjacent to each of the common electrode lines, a distance between one of the gate lines and the common electrode line is less than a distance between the other gate line and the common electrode line.

Optionally, the display substrate further includes: a plurality of thin film transistors and a plurality of pixel electrodes, wherein the plurality of thin film transistors and the plurality of pixel electrodes are respectively located in the plurality of pixel areas in a one-to-one correspondence; and the thin film transistor includes a gate electrode, a source electrode and a drain electrode; the gate electrode is connected to the gate line that is most proximal to the gate electrode; the source electrode is connected to the data line that is most proximal to the source electrode; and the drain electrode is connected to the pixel electrode located in the same pixel area as the thin film transistor.

Optionally, the thin film transistor includes the gate electrode, a gate insulating layer, an active layer, an interlayer dielectric layer and a source-drain electrode sequentially distributed along a direction away from the base substrate; the source-drain electrode includes the source electrode and the drain electrode, the source electrode and the drain electrode are not in contact with each other, and are in contact with the active layer, respectively; and the display substrate further includes: an insulating layer located between the common electrode and the gate line, and a passivation layer located between the source-drain electrode and the pixel electrode.

Optionally, in two gate lines adjacent to each of the common electrode lines, a distance between one of the gate lines and the common electrode line is less than a distance between the other gate line and the common electrode line; the plurality of common electrodes are arranged in multiple rows along a data line scanning direction; for each of the common electrode lines, the target wire segment is an arc-shaped wire segment bending towards a direction proximal to the target gate line, the common electrode line is connected to a target common electrode, and is connected to a common electrode adjacent to and located in the same row as the target common electrode by a bridging line crossing over the target gate line, and the target common electrode and the common electrode line are located in the same pixel area;

the display substrate further includes: a plurality of thin film transistors, a plurality of pixel electrodes, an insulating layer and a passivation layer; the plurality of thin film transistors and the plurality of pixel electrodes are respectively located in the plurality of pixel areas in a one-to-one correspondence; the thin film transistor includes a gate electrode, a gate insulating layer, an active layer, an interlayer dielectric layer and a source-drain electrode sequentially distributed in a direction away from the base substrate; the source-drain electrode includes a source electrode and a drain electrode; the source electrode is not in contact with the drain electrode, and the source electrode and the drain electrode are in contact with the active layer, respectively;

the gate electrode is connected to the gate line that is most proximal to the gate electrode; the source electrode is connected to the data line that is most proximal to the source electrode; the drain electrode is connected to the pixel electrode located in the same pixel area as the thin film transistor; and the insulating layer is located between the common electrode and the gate line, and the passivation layer is located between the source-drain electrode and the pixel electrode.

In another aspect, a manufacturing method of a display substrate is provided. The method includes:

forming a plurality of gate lines, a plurality of data lines, a plurality of common electrode lines and a plurality of common electrodes on a base substrate, wherein the plurality of gate lines and the plurality of data lines intersect to define a plurality of pixel areas; the plurality of common electrodes are located in the plurality of pixel areas in a one-to-one correspondence; an extending direction of the plurality of gate lines is parallel to an extending direction of the plurality of common electrode lines, the plurality of gate lines and the plurality of common electrode lines are alternately arranged one by one; the common electrode line includes a plurality of target wire segments and non-target wire segments; each of the target wire segments is a wire segment where the common electrode line and one data line intersect, and the non-target wire segment is a wire segment on the common electrode line except the target wire segments; and for each of the common electrode lines, a distance between any position point on the target wire segment and a target gate line is less than a distance between the non-target wire segment and the target gate line, the target gate line being the gate line that is most proximal to the common electrode line, and common electrodes located on both sides of the target gate line and adjacent to the target gate line are connected to the common electrode line.

Optionally, forming the plurality of gate lines, the plurality of data lines, the plurality of common electrode lines and the plurality of common electrodes on the base substrate includes:

forming the plurality of common electrodes on the base substrate, wherein the plurality of common electrodes are arranged in multiple columns;

forming the plurality of gate lines and the plurality of common electrode lines on the base substrate on which the common electrodes have been formed, wherein one column of the common electrodes is arranged between every two adjacent gate lines; and forming the plurality of data lines on the base substrate on which the gate lines and the common electrode lines have been formed, wherein the plurality of data lines and the plurality of target wire segments of each of the common electrode lines intersect one by one.

Optionally, for each of the common electrode lines, the target wire segment bends in a direction towards the target gate line.

Optionally, the target wire segment is an arc-shaped wire segment.

Optionally, the plurality of common electrodes are further arranged in multiple rows; and for each of the common electrode lines, the common electrode line is connected to a target common electrode, and is connected to a common electrode adjacent to and located in the same row as the target common electrode by a bridging line crossing over the target gate line, and the target common electrode and the common electrode line are located in the same pixel area.

Optionally, in two gate lines adjacent to each of the common electrode lines, a distance between one of the gate lines and the common electrode line is less than a distance between the other gate line and the common electrode line.

Optionally, the method further includes:

forming a plurality of thin film transistors and a plurality of pixel electrodes on the base substrate, wherein the plurality of thin film transistors and the plurality of pixel electrodes are respectively located in the plurality of pixel areas in a one-to-one correspondence; and the thin film transistor includes a gate electrode, a source electrode and a drain electrode; the gate electrode is connected to the gate line that is most proximal to the gate electrode; the source electrode is connected to the data line that is most proximal to the source electrode; and the drain electrode is connected to the pixel electrode located in the same pixel area as the thin film transistor.

Optionally, the thin film transistor includes the gate electrode, a gate insulating layer, an active layer, an interlayer dielectric layer and a source-drain electrode sequentially distributed along a direction away from the base substrate; the source-drain electrode includes the source electrode and the drain electrode, the source electrode and the drain electrode are not in contact with each other, and are in contact with the active layer, respectively; and the method further includes:

forming an insulating layer between the common electrode and the gate line, and forming a passivation layer between the source-drain electrode and the pixel electrode.

In yet another aspect, a repairing method of a display substrate is provided. The repairing method is for applying to the display substrate according to the above one aspect or any one optional implementations of the one aspect.

determining a first repairing point and a second repairing point according to a breaking point of a first data line when the first data line is broken, wherein the first repairing point is an intersection point between a first common electrode line and the first data line; the second repairing point is an intersection point between a second common electrode line and the first data line; the first common electrode line and the second common electrode line are adjacent to each other and are sequentially arranged along a gate line scanning direction; and the breaking point is located between the first common electrode line and the second common electrode line;

determining a plurality of cutting points according to the first repairing point and the second repairing point, wherein the plurality of cutting points includes: first cutting points on two first target wire segments, second cutting points on two second target wire segments, a third cutting point on a bridging line between the first common electrode line and a first common electrode, and a fourth cutting point on a bridging line between a third common electrode line and a second common electrode; the two first target wire segments are a target wire segment where the first data line and the first common electrode line intersect and a target wire segment where the first data line and the second common electrode line intersect; the two second target wire segments are a target wire segment where a second data line and the first common electrode line intersect and a target wire segment where the second data line and the second common electrode line intersect; the second data line is a previous data line of the first data line; the first common electrode, a third common electrode and the second common electrode are adjacent to one another and are sequentially arranged in the same row along the gate line scanning direction; the third common electrode is located in a pixel area surrounded by a first gate line, a second gate line, the first data line and the second data line; the first gate line is a target gate line corresponding to the first common electrode line; the second gate line is a target gate line corresponding to the second common electrode line; and the second common electrode line and the third common electrode line are adjacent to each other and are sequentially arranged along the gate line scanning direction;

connecting the first data line to the first common electrode line at the first repairing point, and connecting the first data line to the second common electrode line at the second repairing point; and cutting corresponding common wires at each of the cutting points, the common wires including the first target wire segments, the second target wire segments and the bridging lines.

Optionally, the first cutting points are located on the two first target wire segments and behind the first data line;

the second cutting points are located on the two second target wire segments and behind the second data line;

the third cutting point is located on a bridging line between the first common electrode line and the first common electrode; and the fourth cutting point is located on a bridging line between the third common electrode line and the second common electrode.

Optionally, connecting the first data line to the first common electrode line at the first repairing point includes:

welding the first data line and the first common electrode line at the first repairing point through a laser welding process; and connecting the first data line to the second common electrode line at the second repairing point includes:

welding the first data line and the second common electrode line at the second repairing point through the laser welding process.

Optionally, cutting the corresponding common wires at each of the cutting points includes: cutting the corresponding common wires at each of the cutting points through a laser cutting process.

In yet another aspect, a display apparatus is provided. The display apparatus includes the display substrate according to the above one aspect or any one optional implementations of the one aspect.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

FIG. 9 is a flowchart of a repairing method of a display substrate provided by an embodiment of the present disclosure;

The accompanying drawings, which are incorporated in and constitute a part of this specification, illustrate embodiments consistent with the present disclosure, and together with the description, serve to explain the principles of the present disclosure.

DETAILED DESCRIPTION

To make the principles, technical solutions and advantages of the present disclosure clearer, the present disclosure will be described in detail below with reference to the accompanying drawings. Apparently, the described embodiments are merely some embodiments of the present disclosure, rather than all embodiments. Based on the embodiments of the present disclosure, all other embodiments derived by a person of ordinary skill in the art without creative efforts shall fall within the protection scope of the present disclosure.

Figure 1:
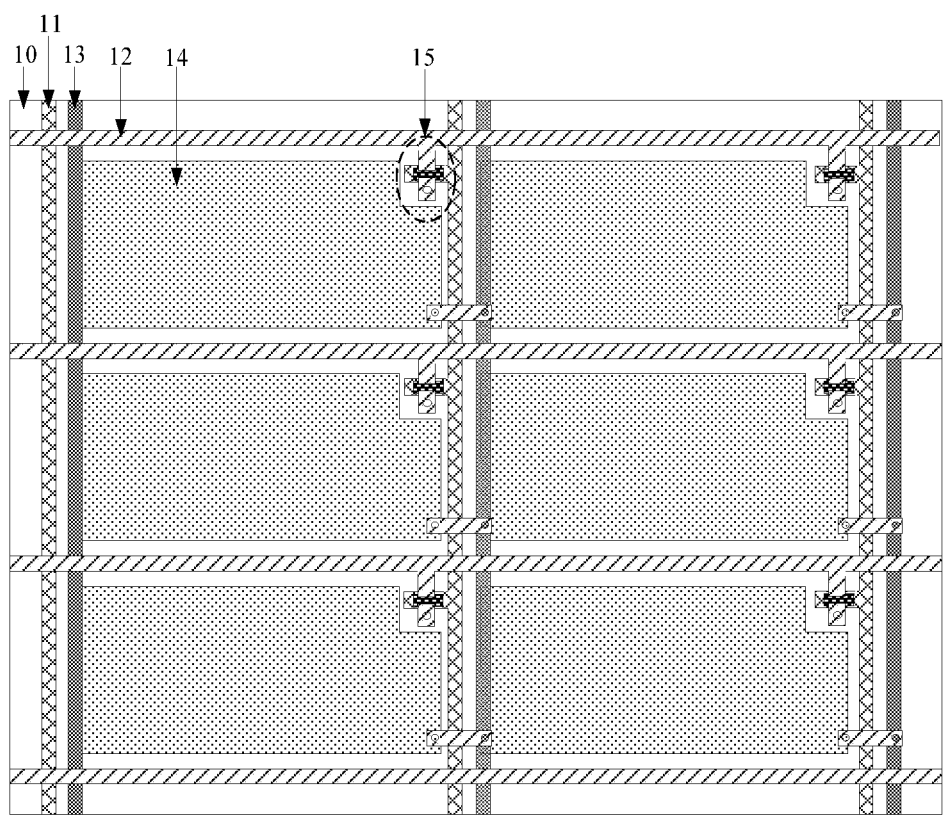
FIG. 1 is a front view of a display substrate provided by an embodiment of the present disclosure.

FIG. 1 shows a schematic diagram of a front view structure of a display substrate 1 provided by an embodiment of the present disclosure. Referring to FIG. 1, the display substrate 1 includes a base substrate 10, and a plurality of gate lines 11, a plurality of data lines 12 and a plurality of common electrode lines 13 on the base substrate 10. The plurality of common electrode lines 13 are parallel to the plurality of gate lines 11, and common electrode lines 13 and gate lines 11 are alternately arranged one by one. The plurality of gate lines 11 and the plurality of data lines 12 intersect to define a plurality of pixel areas (not shown in FIG. 1). The display substrate 1 further includes a plurality of common electrodes 14, a plurality of thin film transistors (TFT) 15 and a plurality of pixel electrodes (not shown in FIG. 1) which are located in the plurality of pixel areas in a one-to-one correspondence. When any data line 12 is broken, the data line 12 and the common electrode line 13 may be welded at an intersection between the data line 12 and the common electrode line 13, so that a signal on the data line 12 can be transmitted through the common electrode line 13 by bypassing a breaking point, thereby achieving a repair effect on the data line 12. However, in the display substrate 1 shown in FIG. 1, the distance between the common electrode 14 and the intersection is small, and is usually 3.5 μm (micrometers), which results in insufficient space for welding operation. Thus, it is difficult to perform welding work, leading to a lower success rate in repairing the data line.

Figure 2:
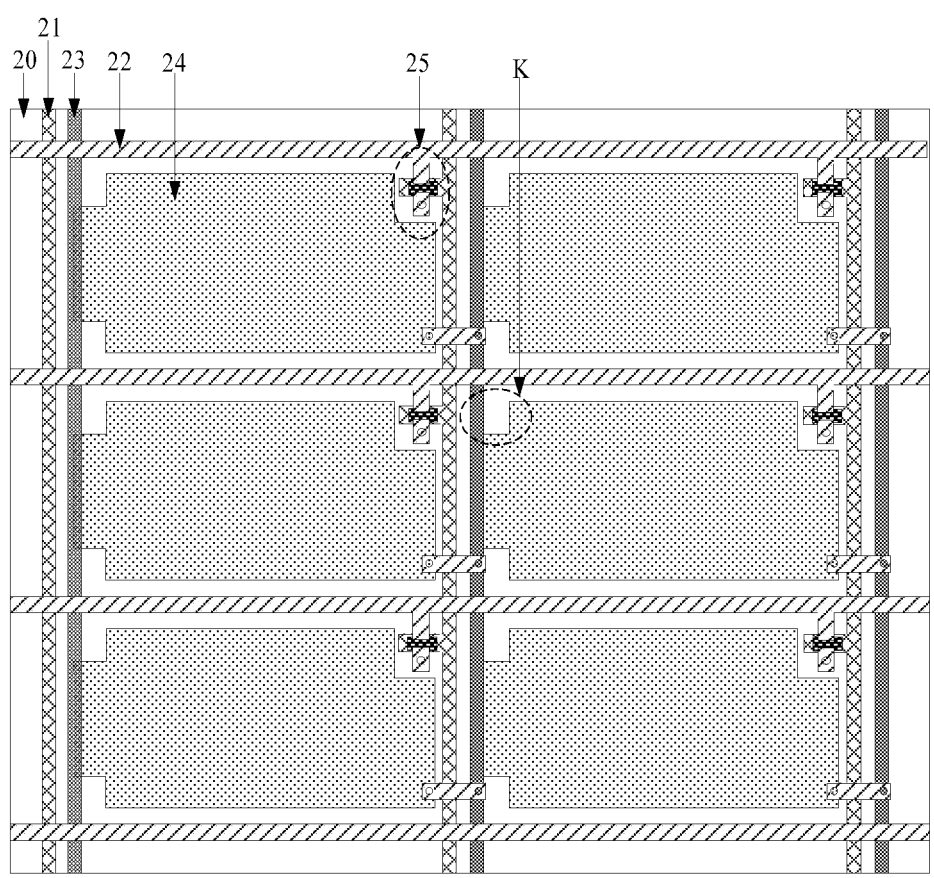
FIG. 2 is a front view of another display substrate provided by an embodiment of the present disclosure.

Referring to FIG. 2, which shows a schematic diagram of a front view structure of another display substrate 2 provided by an embodiment of the present disclosure, similar to the display substrate 1 shown in FIG. 1, the display substrate 2 includes a base substrate 20, and a plurality of gate lines 21, a plurality of data lines 22, a plurality of common electrode lines 23, a plurality of common electrodes 24, a plurality of TFTs 25 and a plurality of pixel electrodes (not shown in FIG. 2) on the base substrate 20. There is a notch K on a corner of each of the common electrodes 24 proximal to an intersection between the common electrode line 23 and the data line 22. In this way, a distance between each common electrode 24 and the intersection is relatively large, and is usually 7.0 μm, thereby facilitating implementation of the welding work. However, an aperture ratio of the display substrate is positively related to an effective display area of the common electrode (for example, an area where the common electrode faces the pixel electrode); and in the display substrate 2 shown in FIG. 2, the notch K may result in a smaller effective display area of the common electrode 24, thereby decreasing the aperture ratio of the display substrate 2.

Embodiments of the present disclosure provide a display substrate and manufacturing method, repairing method thereof, and a display apparatus. In the display substrate, for each of the common electrode lines, a distance between any position point on a target wire segment and a target gate line is less than a distance between a non-target wire segment and the target gate line. The target wire segment is a wire segment where the common electrode line and a data line intersect, and the non-target wire segment is a wire segment on the common electrode line except the target wire segment. In this way, a distance between a common electrode and a target conductive line can be larger without changing an area of the common electrode, so that a distance between the common electrode and an intersection (which is the intersection between the common electrode line and the data line) is larger, thereby facilitating implementation of welding work, increasing the success rate in repairing the data line, and leading to a higher aperture ratio of the display substrate. For the solutions of the present disclosure, reference can be made to the following embodiments.

Figure 3:
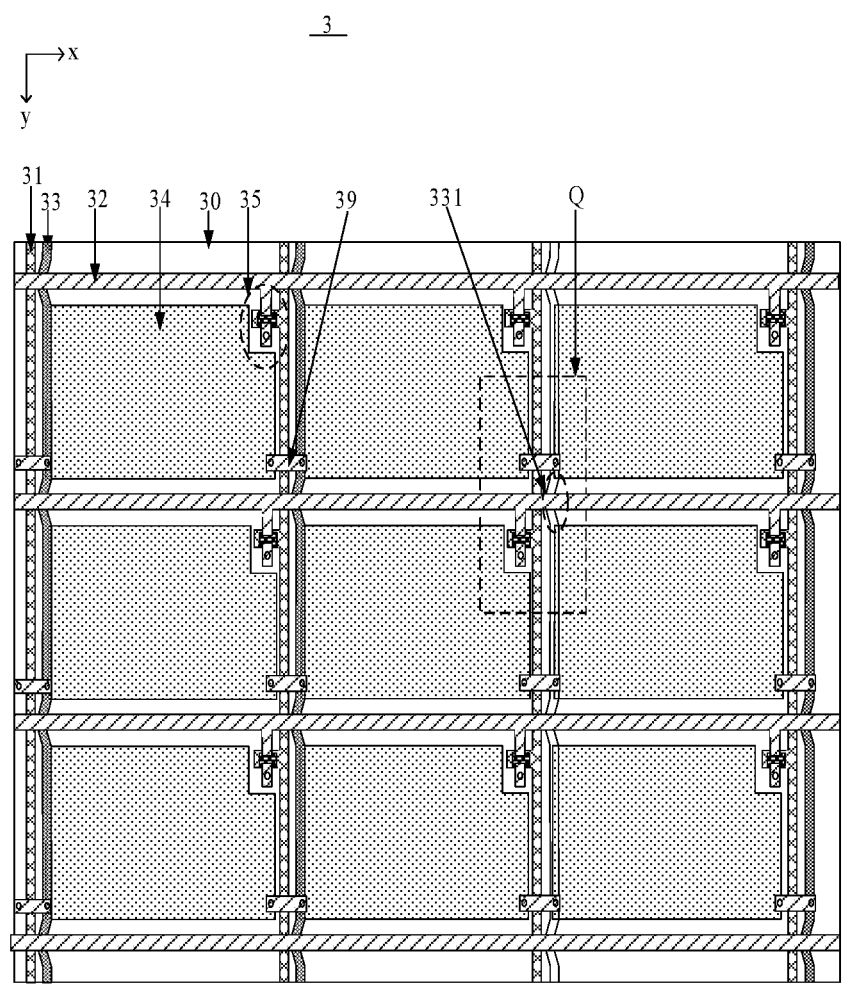
FIG. 3 is a front view of a display substrate provided by an embodiment of the present disclosure.
Figure 4:
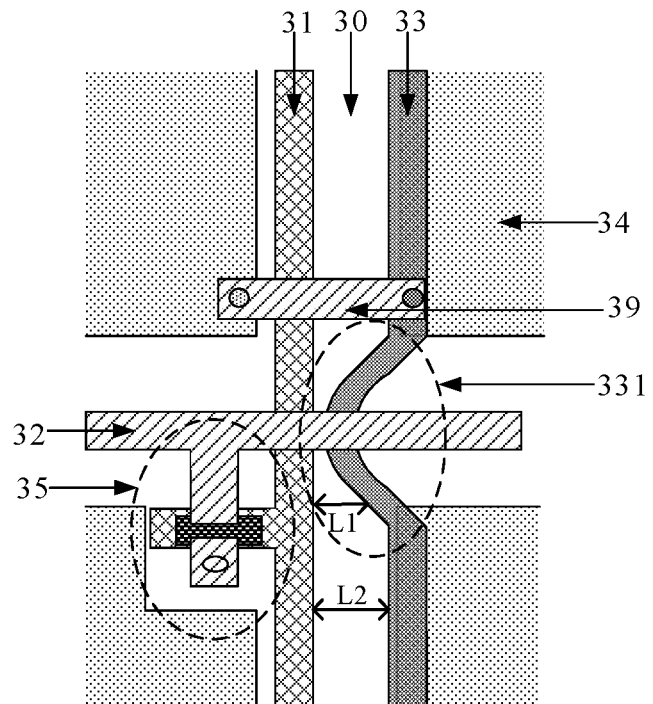
FIG. 4 is an enlarged view of the region Q in the display substrate shown in FIG. 3.
Figure 5:
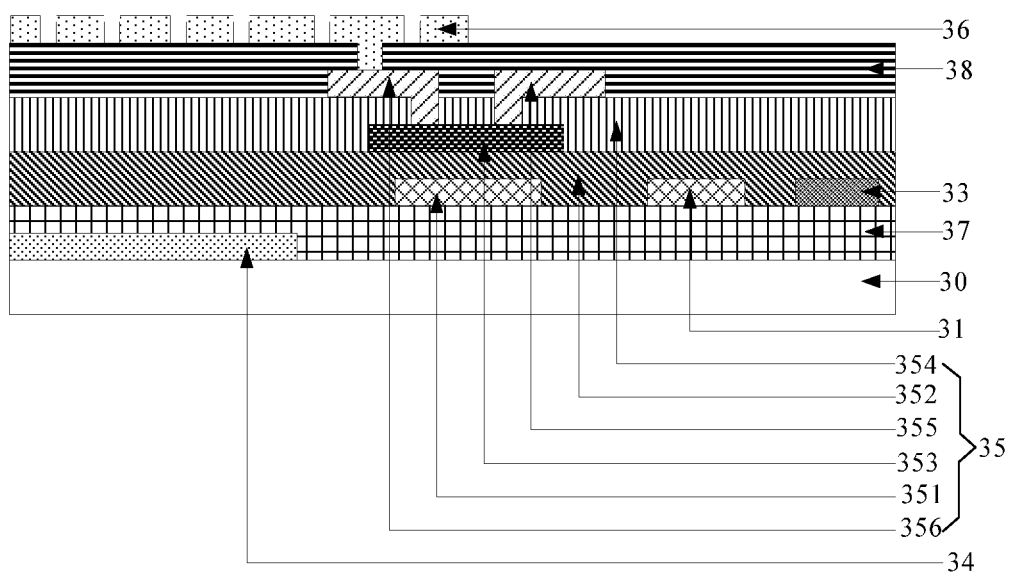
FIG. 5 is a section view of a display substrate provided by an embodiment of the present disclosure.

FIG. 3 is a front view of a display substrate 3 provided by an embodiment of the present disclosure. FIG. 4 is an enlarged view of the region Q in the display substrate 3 shown in FIG. 3. FIG. 5 is a section view of a display substrate 3 provided by an embodiment of the present disclosure. Referring to FIG. 3 to FIG. 5, the display substrate 3 includes a base substrate 30, and a plurality of gate lines 31, a plurality of data lines 32, a plurality of common electrode lines 33 and a plurality of common electrodes 34 on the base substrate 30. The plurality of gate lines 31 and the plurality of data lines 32 intersect to define a plurality of pixel areas (not shown in FIG. 3 to FIG. 5). Each pixel area is surrounded by two adjacent gate lines 31 and two adjacent data lines 32. The plurality of common electrodes 34 are located in the plurality of pixel areas in a one-to-one correspondence. An extending direction of the plurality of gate lines 31 is parallel to an extending direction of the plurality of common electrode lines 33, and the plurality of gate lines 31 and the plurality of common electrode lines 33 are alternately arranged one by one.

As shown in FIG. 3 and FIG. 4, each common electrode line 33 includes a plurality of target wire segments 331 and non-target wire segments (not shown in FIG. 3 and FIG. 4). Each of the target wire segments 331 is a wire segment where the common electrode line 33 and one data lines 32 intersect, and the non-target wire segments are wire segments on the common electrode line 33 except the plurality of target wire segments 331. For each of the common electrode lines 33, a distance L1 between any position point on the target wire segment 331 and a target gate line is less than a distance L2 between the non-target wire segment and the target gate line. The target gate line is the gate line 31 that is most proximal to the common electrode line 33, and common electrodes 34 located on both sides of the target gate line and adjacent to the target gate line are connected to the common electrode line 33. Those skilled in the art can easily understand that for each of the common electrode lines 33, the target wire segments 331 and the non-target wire segments are connected, and the distance between the position point of the connection portion on the target wire segment 331 and the target gate line may be a maximum distance between the target wire segment 331 and the target gate line; and at the connection portion, the distance between the target wire segment 331 and the target gate line may be equal to the distance between the non-target wire segment and the target gate line. Unless otherwise stated, in the embodiments of the present disclosure, "any position point on the target wire segment" 331 refers to a position point on the target wire segment 331 except the position point of the portion for connecting the non-target wire segment.

Figure 6:
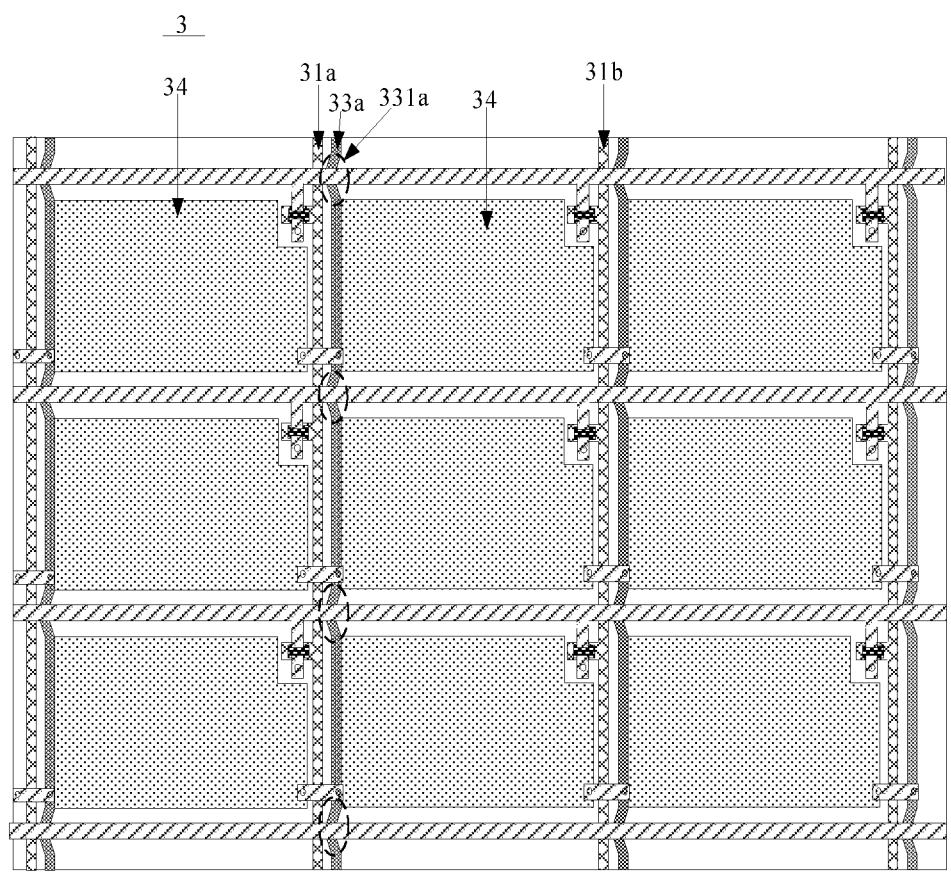
FIG. 6 is a front view of another display substrate provided by an embodiment of the present disclosure.

Exemplarily, FIG. 6 is a front view of another display substrate 3 provided by an embodiment of the present disclosure. As shown in FIG. 6, for the common electrode line 33a, the target gate line may be the gate line 31a. The common electrode line 33a includes a plurality of target wire segments 331a and non-target wire segments (not shown in FIG. 6). The distance (not shown in FIG. 6) between any position point on the target wire segment 331a and the gate line 31a is less than the distance (not shown in FIG. 6) between the non-target wire segment on the common electrode line 33a and the gate line 31a. Both common electrodes 34 located on both sides of the gate line 31a and adjacent to the gate line 31a are connected to the common electrode line 33a.

In summary, in the display substrate provided by the embodiment of the present disclosure, for each of the common electrode lines, the distance between any position point on the target wire segment and the target gate line is less than the distance between the non-target wire segment and the target gate line. The target wire segment is a wire segment where the common electrode line and the data line intersect, and the non-target wire segment is a wire segment on the common electrode line except the target wire segments. Thus, in the display substrate, the distance between the common electrode and the target conductive wire can be larger without changing the area of the common electrode, so that the distance between the common electrode and the intersection (which is the intersection between the common electrode line and the data line) is larger, thereby facilitating implementation of welding work, increasing the success rate in repairing the data line, and leading to a higher aperture ratio of the display substrate.

Optionally, as shown in FIG. 3, in two gate lines 31 adjacent to each of the common electrode lines 33, a distance between one of the gate line 31 and the common electrode line 33 is less than a distance between the other gate line 31 and the common electrode line 33. For example, as shown in FIG. 6, the two gate lines adjacent to the common electrode line 33a include a gate line 31a and a gate line 31b. In the two gate lines, the distance between the gate line 31a and the common electrode line 33a is less than the distance between the gate line 31b and the common electrode line 33a.

Optionally, as shown in FIG. 3, FIG. 4, and FIG. 6, for each of the common electrode lines 33, the target wire segment 331 bends in a direction towards the target gate line. Optionally, the target wire segment 331 may be an arc-shaped wire segment.

Optionally, as shown in FIG. 3, the plurality of common electrodes 34 are arranged in multiple columns along a gate line scanning direction x, and are arranged in multiple rows along a data line scanning direction y. The column direction is perpendicular to the gate line scanning direction x, the row direction is perpendicular to the data line scanning direction y. For each of the common electrode lines 33, the common electrode line 33 is connected to a target common electrode, and is connected to a common electrode 34 adjacent to and located in the same row as the target common electrode by a bridging line 39 crossing over the target gate line. Here, each of the common electrode lines 33 is partially located in the pixel area. The portion of each common electrode line 33 located in the pixel area is connected to the target common electrode, and is connected to the common electrode 34 adjacent to and located in the same row as the target common electrode by the bridging line 39 crossing over the target gate line. The target common electrode is a common electrode located in the same pixel area as the common electrode line 33.

Optionally, continuing referring to FIG. 3 to FIG. 5, the display substrate 3 further includes: a plurality of TFTs 35 and a plurality of pixel electrodes 36. The plurality of TFTs 35 and the plurality of pixel electrodes 36 are respectively located in the plurality of pixel areas in a one-to-one correspondence. As shown in FIG. 5, each of the TFTs 35 includes a gate electrode 351, a gate insulating layer 352, an active layer 353, an interlayer dielectric layer 354 and a source-drain electrode sequentially distributed along a direction away from the base substrate 30. The source-drain electrode includes a source electrode 355 and a drain electrode 356. The source electrode 355 and the drain electrode 356 are not in contact with each other, but are in contact with the active layer 353, respectively. The gate electrode 351 is connected to the gate line 31 that is most proximal to the gate electrode 351, the source electrode 355 is connected to the data line 32 that is most proximal to the source electrode 355, the drain electrode 356 is connected to the pixel electrode 36 located in the same pixel area as the TFT 35. Optionally, as shown in FIG. 5, the gate line 31, the common electrode line 33 and the gate electrode 351 are distributed on the same layer. The display substrate 3 further includes an insulating layer 37 located between the common electrode 34 and the gate line 31, and a passivation layer 38 located between the source-drain electrode and the pixel electrode 36. In the embodiment of the present disclosure, structures distributed on different layers can be connected through via holes. For example, the common electrode line 33 and the common electrode 34 are distributed on different layers, and the common electrode line 33 may be connected to the common electrode 34 through a via hole (not shown in FIG. 5) on the insulating layer 37. In another example, the source-drain electrode and the active layer 353 are distributed on different layers. The source electrode 355 and the drain electrode 356 may be respectively connected to the active layer 353 through via holes on the interlayer dielectric layer 354. In another example, the pixel electrode 36 and the drain electrode 356 are distributed on different layers, and the pixel electrode 36 may be connected to the drain electrode 356 through a via hole on the passivation layer 38, which will not be enumerated in the embodiment of the present disclosure one by one herein.

Optionally, the display substrate 3 may be an advanced super dimension switch (ADS)-type display substrate. As shown in FIG. 5, the pixel electrode 36 may be a slit electrode (that is, there is a slit on the pixel electrode 36). With the slit, the formation of a voltage between the common electrode 34 and the pixel electrode 36 is facilitated.

Optionally, the base substrate 30 may be a transparent substrate, for example, may be a rigid substrate made of a light guide and non-metallic material, such as glass, quartz, or transparent resin, which has some rigidity. Or, the base substrate 30 may be a flexible substrate made of a flexible material such as polyimide (PI). The gate line 31, the common electrode line 33 and the gate electrode 351 may be manufactured by a single patterning process, and may be made of the same material, such as metal molybdenum (Mo), Copper (Cu), Aluminum (Al), Titanium (Ti), or an alloy thereof. The data line 32, the source electrode 355, the drain electrode 356 and the bridging line 39 may be manufactured by a single patterning process, and may be made of the same material, such as the metal Mo, Cu, Al, Ti, or an alloy thereof. Both the common electrode 34 and the pixel electrode 36 may be transparent electrodes, and may be made of the same or different material(s). For example, both the common electrode 34 and the pixel electrode 36 may be made of indium tin oxide (ITO), indium zinc oxide (IZO), aluminum-doped zinc oxide (ZnO:Al), or other metal oxides. The active layer 353 may be a semiconductor active layer or an oxide active layer. For example, the active layer 353 is the semiconductor active layer made of a semiconductor material such as amorphous silicon or polysilicon, or is the oxide active layer made of a semiconductor oxide such as indium gallium zinc oxide (IGZO) or indium tin zinc oxide (ITZO). The gate insulating layer 352, the interlayer dielectric layer 354, the insulating layer 37 and the passivation layer 38 may be made of an inorganic material such as silicon oxide (SiOx), silicon nitride (SiNx), aluminum oxide ($Al_2O_3$) or silicon oxynitride (SiOxNx), and may be made of the same or different material(s). In the embodiments of the present disclosure, the manufacturing processes and the materials of each film layer are not limited.

In summary, in the display substrate provided by the embodiment of the present disclosure, for each of the common electrode lines, the distance between any position point on the target wire segment and the target gate line is less than the distance between the non-target wire segment and the target gate line. The target wire segment is a wire segment where the common electrode line and the data line intersect, and the non-target wire segment is a wire segment on the common electrode line except the target wire segment. Thus, in the display substrate, the distance between the common electrode and the target conductive line can be larger without changing the area of the common electrode, so that the distance between the common electrode and the intersection (which is the intersection between the common electrode line and the data line) is larger, thereby facilitating implementation of welding work, increasing the success rate in repairing the data line, and leading to a higher aperture ratio of the display substrate. The display substrate provided by the embodiment of the present disclosure can increase the success rate in repairing the data line while satisfying photoelectric performance of a product, thereby improving a yield of the product.

The following are embodiments of a manufacturing method of a display substrate provided by the embodiments of the present disclosure. For the manufacturing method of the display substrate and principle thereof in the embodiments of the present disclosure, reference can be made to the descriptions in the following embodiments.

An embodiment of the present disclosure provides a manufacturing method of a display substrate. The method includes the following steps.

A plurality of gate lines, a plurality of data lines, a plurality of common electrode lines and a plurality of common electrodes are formed on a base substrate.

The plurality of gate lines and the plurality of data lines intersect to define a plurality of pixel areas. The plurality of common electrodes are located in the plurality of pixel areas in a one-to-one correspondence. An extending direction of the plurality of gate lines is parallel to an extending direction of the plurality of common electrode lines, the plurality of gate lines and the plurality of common electrode lines are alternately arranged one by one. The common electrode line includes a plurality of target wire segments and non-target wire segments. Each of the target wire segments is a wire segment where the common electrode line and one of the data lines intersect, and the non-target wires segment are wire segments on the common electrode line except the target wire segments. For each of the common electrode lines, a distance between any position point on the target wire segment and a target gate line is less than a distance between the non-target wire segment and the target gate line. The target gate line is the gate line that is most proximal to the common electrode line in the plurality of gate lines. Common electrodes located on both sides of the target gate line and adjacent to the target gate line are connected to the common electrode line.

Figure 7:
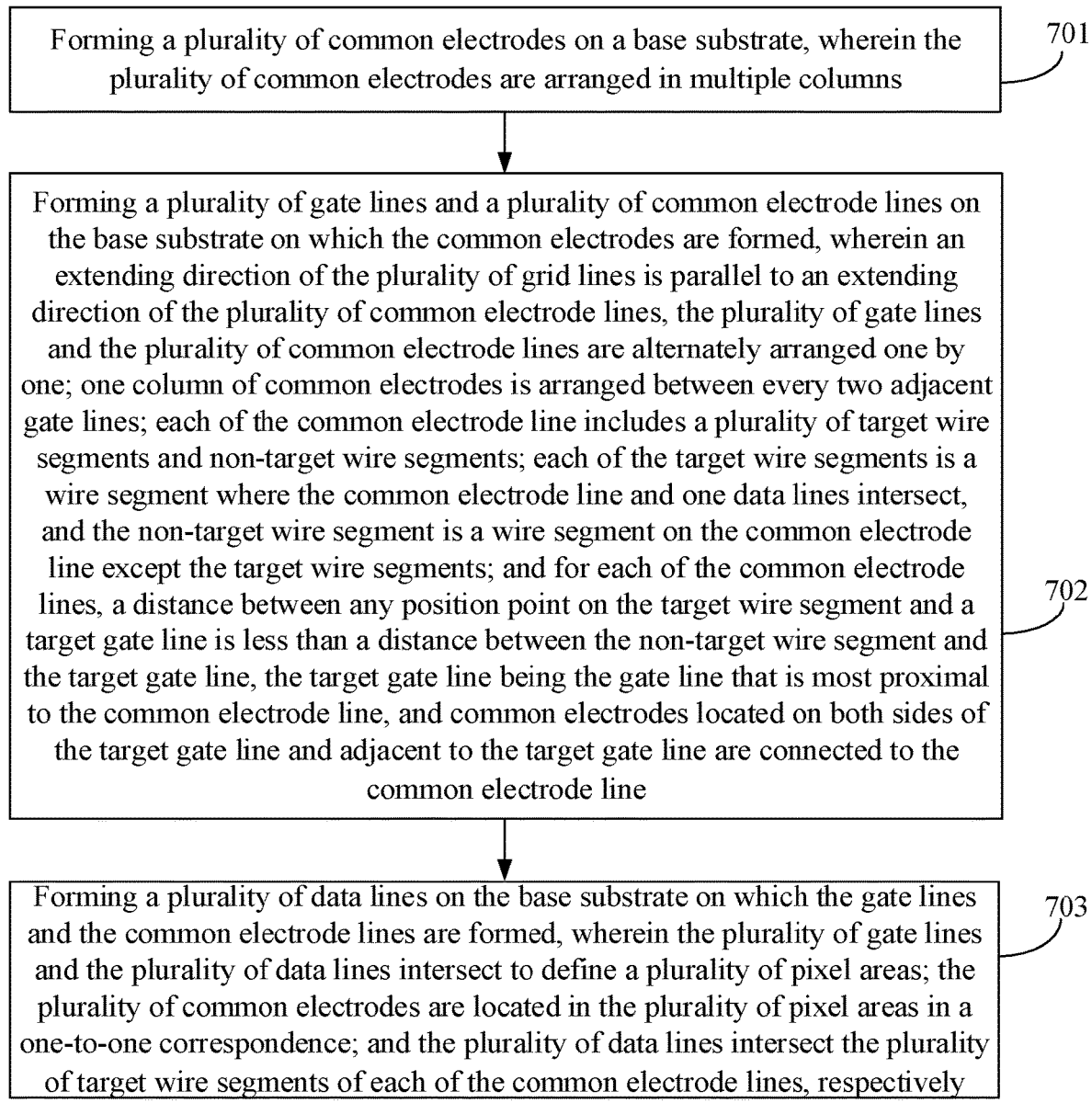
FIG. 7 is a flowchart of a manufacturing method of a display substrate provided by an embodiment of the present disclosure.

Exemplarily, FIG. 7 shows a flowchart of a manufacturing method of a display substrate provided by an embodiment of the present disclosure. Referring to FIG. 7, the method may include the following steps.

In step 701, a plurality of common electrodes are formed on the base substrate, and are arrayed in multiple columns.

In step 702, a plurality of gate lines and a plurality of common electrode lines are formed on the base substrate on which the common electrodes have been formed, wherein an extending direction of the plurality of gate lines is parallel to an extending direction of the plurality of common electrode lines, the plurality of gate lines and the plurality of common electrode lines are alternately arranged one by one; one column of common electrodes is arranged between every two adjacent gate lines; each of the common electrode lines includes a plurality of target wire segments and non-target wire segments; each of the target wire segments is a wire segment where the common electrode line and one data line intersect, and the non-target wire segments are wire segments on the common electrode line except the target wire segments; and for each of the common electrode lines, a distance between any position point on the target wire segment and a target gate line is less than a distance between the non-target wire segment and the target gate line, the target gate line being the gate line closest to the common electrode line, and common electrodes located on both sides of the target gate line and adjacent to the target gate line are connected to the common electrode line.

In step 703, a plurality of data lines are formed on the base substrate on which the gate lines and the common electrode lines have been formed, wherein the plurality of gate lines and the plurality of data lines intersect to define a plurality of pixel areas; the plurality of common electrodes are located in the plurality of pixel areas in a one-to-one correspondence; and the plurality of data lines and the plurality of target wire segments of each of the common electrode lines intersect one by one.

In summary, according to the manufacturing method of the display substrate provided by the embodiment of the present disclosure, in the display substrate, for each of the common electrode lines, the distance between any position point on the target wire segment and the target gate line is less than the distance between the non-target wire segment and the target gate line. The target wire segment is a wire segment where the common electrode line and the data line intersect, and the non-target wire segment is a wire segment on the common electrode line except the target wire segments. Thus, in the display substrate, the distance between the common electrode and the target conductive wire can be larger without changing the area of the common electrode, so that the distance between the common electrode and the intersection (which is the intersection between the common electrode line and the data line) is larger, thereby facilitating implementation of welding work, increasing the success rate in repairing the data line, and leading to a higher aperture ratio of the display substrate.

Optionally, for each of the common electrode lines, the target wire segment bends in a direction towards the target gate line.

Optionally, the target wire segment is an arc-shaped wire segment.

Optionally, the plurality of common electrodes are further arranged in multiple rows in an array. For each of the common electrode lines, the common electrode line is connected to a target common electrode, and is connected to a common electrode adjacent to and located in the same row as the target common electrode by a bridging line crossing over the target gate line; and the target common electrode and the common electrode line are located in the same pixel area.

Optionally, in two gate lines adjacent to each of the common electrode lines, a distance between one gate line and the common electrode line is less than a distance between the other gate line and the common electrode line.

Optionally, the method further includes: forming a plurality of TFTs and a plurality of pixel electrodes on the base substrate, wherein the plurality of TFTs and the plurality of pixel electrodes are respectively located in the plurality of pixel areas in a one-to-one correspondence; and the TFT includes a gate electrode, a source electrode and a drain electrode; the gate electrode is connected to the gate line that is most proximal to the gate electrode; the source electrode is connected to the data line that is most proximal to the source electrode; and the drain electrode is connected to the pixel electrode located in the same pixel area as the TFT.

Optionally, the TFT includes the gate electrode, a gate insulating layer, an active layer, an interlayer dielectric layer and a source-drain electrode sequentially distributed along a direction away from the base substrate. The source-drain electrode includes the source electrode and the drain electrode. The source electrode and the drain electrode are not in contact with each other, but are in contact with the active layer, respectively.

The method further includes: forming an insulating layer between the common electrode and the gate line; and forming a passivation layer between the source-drain electrode and the pixel electrode.

All of the above optional technical solutions can form other optional embodiments of the present disclosure from an arbitrary combination thereof, and the description thereof will not be repeated herein.

Figure 8:
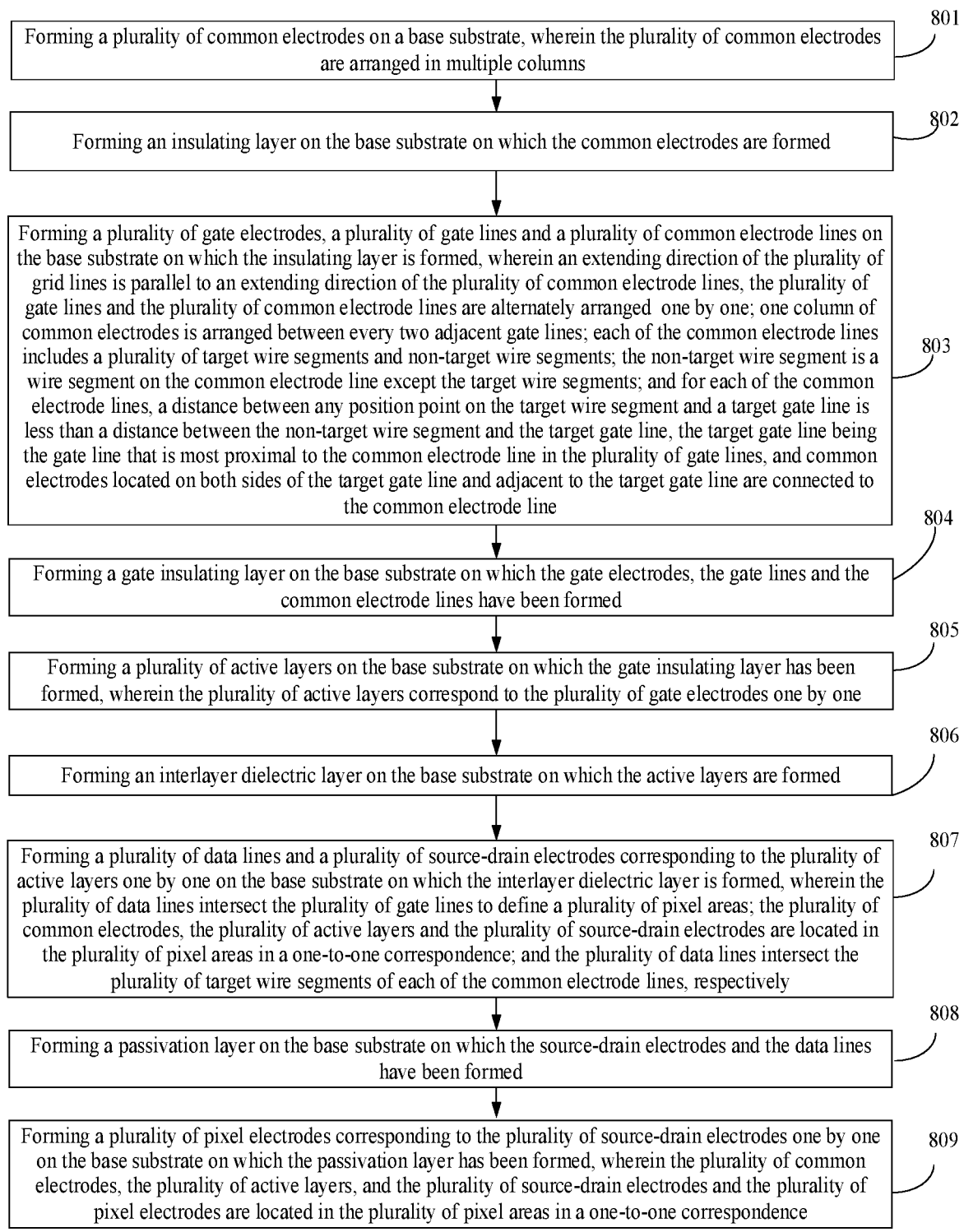
FIG. 8 is a flowchart of another manufacturing method of a display substrate provided by an embodiment of the present disclosure.

FIG. 8 shows a flowchart of another manufacturing method of a display substrate provided by an embodiment of the present disclosure. The manufacturing method of the display substrate can be used to manufacture the display substrate 3 in the above embodiments. Referring to FIG. 8, the method may include the following steps.

In step 801, a plurality of common electrodes are formed on the base substrate, and are arrayed in multiple columns.

As shown in FIG. 3, the plurality of common electrodes 34 are arranged in an array on the base substrate 30 with multiple rows and columns. The column direction may be a direction y, the row direction may be a direction x, and the row direction x is perpendicular to the column direction y. In the embodiment of the present disclosure, the common electrode 34 may be made of a transparent conductive material which may be a metal oxide such as ITO, IZO, ZnO:Al, or the like. Taking the material of the common electrode 34 being ITO as an example, a layer of ITO can be deposited on the base substrate 30 through any of the processes such as magnetron sputtering, thermal evaporation, plasma enhanced chemical vapor deposition (PECVD), or the like, to obtain an ITO material layer; and the ITO material layer can be processed through a single patterning process to obtain the plurality of common electrodes 34.

In step 802, an insulating layer is formed on the base substrate on which the common electrodes have been formed.

The insulating layer may be made of a transparent insulating material which may be an inorganic material such as SiOx, SiNx, Al$_2$O$_3$, SiOxNx, or the like. Taking the material of the insulating layer being SiOx as an example, as shown in FIG. 5, a layer of SiOx can be deposited on the base substrate 30 on which the common electrodes 34 have been formed through any of the processes such as magnetron sputtering, thermal evaporation, PECVD, or the like, to obtain an SiOx material layer; and the SiOx material layer can be processed through a single patterning process to obtain the insulating layer 37.

In step 803, a plurality of gate electrodes, a plurality of gate lines and a plurality of common electrode lines are formed on the base substrate on which the insulating layer has been formed, wherein an extending direction of the plurality of gate lines is parallel to an extending direction of the plurality of common electrode lines, and the plurality of gate lines and the plurality of common electrode lines are alternately arranged one by one; one column of common electrodes is arranged between every two adjacent gate lines; the common electrode line includes a plurality of target wire segments and non-target wire segments; the non-target wire segments are wire segments on the common electrode line except the target wire segments; and for each of the common electrode lines, a distance between any position point on the target wire segment and a target gate line is less than a distance between the non-target wire segment and the target gate line, the target gate line being the gate line that is most proximal to the common electrode line in the plurality of gate lines, and common electrodes located on both sides of the target gate line and adjacent to the target gate line are connected to the common electrode line.

As shown in FIG. 3, an extending direction (also referred to as a length direction) of the plurality of gate lines 31 is parallel to an extending direction of the plurality of common electrode lines 33, the plurality of gate lines and the plurality of common electrode lines 33 are alternately arranged one by one. One column of common electrodes 34 is arranged between every two adjacent gate lines 31. In two gate lines 31 adjacent to each common electrode line 33, a distance between one gate line 31 and the common electrode line 33 is less than a distance between the other gate line 31 and the common electrode line 33. Each of the common electrode lines 33 includes a plurality of target wire segments 331 and non-target wire segments (not shown in FIG. 3). For each of the common electrode lines 33, a distance between any position point on the target wire segment 331 and a target gate line is less than a distance between the non-target wire segment and the target gate line, the target gate line being the gate line that is most proximal to the common electrode line 33 in the plurality of gate lines 31; and common electrodes 34 located on both sides of the target gate line and adjacent to the target gate line are connected to the common electrode line 33. The non-target wire segments on each of the common electrode lines 33 are wire segments on the common electrode line 33 except the plurality of target wire segments 331. The common electrode line 33 may be connected to the common electrode 34 through a bridging line 39. Exemplarily, as shown in FIG. 6, in the two gate lines adjacent to the common electrode line 33a, a distance between the gate line 31a and the common electrode line 33a is less than a distance between the gate line 31b and the common electrode line 33a. The common electrode line 33a includes a plurality of target wire segments 331a and non-target wire segments. Thus, for the common electrode line 33a, the target gate line may be the gate line 31a, and the distance between any position point on the target wire segment 331a and the gate line 31a is less than the distance between the non-target wire and the gate line 31a; and the common electrodes 34 located on the both sides of the gate line 31a and adjacent to the gate line 31a are connected to the common electrode line 33a.

In the embodiment of the present disclosure, as shown in FIG. 3 to FIG. 6, the gate lines 31, the common electrode lines 33 and the gate electrodes 351 can be manufactured by a single patterning process, and may be made of the same material, such as metal Mo, Cu, Al, Ti, or an alloy thereof. Taking the gate lines 31, the common electrode lines 33 and the gate electrodes 351 being manufactured by a single patterning process and being made of metal Mo as an example, as shown in FIG. 5, a layer of metal Mo can be deposited on the base substrate 30 on which the insulating layer 37 has been formed, through any of the processes such as magnetron sputtering, thermal evaporation, PECVD or the like, to obtain a metal Mo material layer; and the metal Mo material layer can be processed through a single patterning process to obtain the plurality of gate electrodes 351, the plurality of gate lines 31 and the plurality of common electrode lines 33. Each gate electrode 351 is connected to the gate line 31 that is most proximal to the gate electrode 351.

Those skilled in the art can easily understand that the embodiment of the present disclosure is illustrated by taking the gate lines 31, the common electrode lines 33 and the gate electrodes 351 being manufactured by a single patterning process as an example. In practical applications, the gate lines 31, the common electrode lines 33 and the gate electrodes 351 can be manufactured by three patterning processes, which is not limited in the embodiment of the present disclosure.

In step 804, a gate insulating layer is formed on the base substrate on which the gate electrodes, the gate lines and the common electrode lines have been formed.

The gate insulating layer may be made of a transparent insulating material which may be an inorganic material such as SiOx, SiNx, Al$_2$O$_3$, SiOxNx or the like. For the process of forming the gate insulating layer, reference can be made to that in step 802.

A process of forming the insulating layer 37 is not repeated in the embodiment of the present disclosure.

In step 805, a plurality of active layers are formed on the base substrate on which the gate insulating layer has been formed, and the plurality of active layers correspond to the plurality of gate electrodes one by one.

The active layers may be made of a semiconductor material such as amorphous silicon or polysilicon, or may be made of a semiconductor oxide such as IGZO or ITZO. Taking the material of the active layer being IGZO as an example, as shown in FIG. 5, a layer of IGZO can be deposited on the base substrate 30 on which the gate insulating layer 352 has been formed through any of the processes such as magnetron sputtering, thermal evaporation, PECVD, or the like, to obtain an IGZO material layer; and the IGZO material layer can be processed through a single patterning process to obtain the plurality of active layers 353 which is in a one-to-one correspondence with the plurality of gate electrodes 351.

In step 806, an interlayer dielectric layer is formed on the base substrate on which the active layers have been formed.

The interlayer dielectric layer may be made of a transparent insulating material which may be an inorganic material such as $SiO_x$, $SiN_x$, $Al_2O_3$, or $SiO_xN_x$. For the process of forming the interlayer dielectric layer, reference can be made to that of forming the insulating layer 37 in step 802, and will not be repeated in the embodiment of the present disclosure.

In step 807, a plurality of data lines and a plurality of source-drain electrodes corresponding to the plurality of active layers one by one are formed on the base substrate on which the interlayer dielectric layer has been formed, wherein the plurality of data lines and the plurality of gate lines intersect to define a plurality of pixel areas; the plurality of common electrodes, the plurality of active layers and the plurality of source-drain electrodes are located in the plurality of pixel areas in a one-to-one correspondence; and the plurality of data lines and the plurality of target wire segments of each of the common electrode lines intersect, one by one.

As shown in FIG. 3, the plurality of data lines 32 are parallel to each other, and the plurality of data lines 32 and the plurality of gate lines 31 intersect to define a plurality of pixel areas. In combination with FIG. 3 and FIG. 5, the plurality of common electrodes 34, the plurality of active layers 353 and the plurality of source-drain electrodes are located in the plurality of pixel areas in a one-to-one correspondence; and the plurality of data lines 32 and the plurality of target wire segments 331 of each of the common electrode lines 33 intersect, one by one.

As shown in FIG. 5, the source-drain electrode includes the source electrode 355 and the drain electrode 356. In the embodiment of the present disclosure, the data line 32, the source electrode 355 and the drain electrode 356 can be made of the same material, and may be manufactured by a single patterning process. For example, the data line 32, the source electrode 355 and the drain electrode 356 may all be made of metal Mo, Cu, Al, Ti, or an alloy thereof. Taking the data line 32, the source electrode 355 and the drain electrode 356 being manufactured by a single patterning process and being made of metal Cu as an example, as shown in FIG. 5, a layer of metal Cu can be deposited on the base substrate 30 on which the interlayer dielectric layer 354 has been formed through any of the processes such as magnetron sputtering, thermal evaporation, PECVD, or the like, to obtain a metal Cu material layer; and the metal Cu material layer can be processed through a single patterning process to obtain the plurality of data lines 32 and the plurality of source-drain electrodes. Each source-drain electrode includes the source electrode 355 and the drain electrode 356 which are not in contact with each other but are respectively in contact with the corresponding active layer 353 through via holes in the interlayer dielectric layer 354. Each source electrode 355 is connected to the data line 32 that is most proximal to the source electrode 355.

In the embodiment of the present disclosure, the common electrode line may be connected to the common electrode through a bridging line which may be manufactured by a single patterning process together with the data line. Thus, in the process of performing step 807, the bridging line may also be formed. Of course, the bridging line and the data line can be manufactured by different patterning processes. When the bridging line and the data line are manufactured by a single patterning process, it is easy to understand that after performing the above step 803, the common electrode line can be not in connected with the common electrode, but after the step 807 is performed, the common electrode line may be connected to the common electrode through the bridging line, which is not limited in the embodiment of the present disclosure. In addition, the embodiment of the present disclosure is illustrated by taking the data line 32, the source electrode 355 and the drain electrode 356 being manufactured by a single patterning process as an example, those skilled in the art can easily understand that the data lines 32, the source electrodes 355 and the drain electrodes 356 can be formed through at least two patterning processes, which is not limited in the embodiment of the present disclosure.

In step 808, a passivation layer is formed on the base substrate on which the source-drain electrodes and the data lines have been formed.

The passivation layer may be made of a transparent insulating material which may be an inorganic material such as $SiO_x$, $SiN_x$, $Al_2O_3$, or $SiO_xN_x$. For the process of forming the passivation layer, reference can be made to that of forming the insulating layer 37 in step 802, and will not be repeated in the embodiment of the present disclosure.

In step 809, a plurality of pixel electrodes corresponding to the plurality of source-drain electrodes one by one are formed on the base substrate on which the passivation layer has been formed, wherein the plurality of common electrodes, the plurality of active layers, the plurality of source-drain electrodes and the plurality of pixel electrodes are located in the plurality of pixel areas in a one-to-one correspondence.

The pixel electrode may be made of a transparent conductive material which may be a metal oxide such as ITO, IZO, or ZnO:Al. Taking the material of the pixel electrode being ITO as an example, as shown in FIG. 5, a layer of ITO can be deposited on the base substrate 30 on which the passivation layer 38 has been formed through any of the processes such as magnetron sputtering, thermal evaporation, PECVD, or the like, to obtain an ITO material layer; and the ITO material layer can be processed through a single patterning process to obtain the plurality of pixel electrodes 36 corresponding to the plurality of source-drain electrodes one by one. The plurality of common electrodes 34, the plurality of active layers 353, the plurality of source-drain electrodes and the plurality of pixel electrodes 36 are respectively located in the plurality of pixel areas in a one-to-one correspondence. The gate electrode 351, the gate insulating layer 352, the active layer 353, the interlayer dielectric layer 354 and the source-drain electrode that are located in the same pixel area form one TFT.

In the manufacturing method of the display substrate provided by the embodiment of the present disclosure, a single patterning process includes photoresist coating, exposure, development, etching, and photoresist peeling off. Processing the material layer (such as the ITO material layer) by a single patterning process includes: firstly, coating a layer of photoresist on the material layer (such as the ITO material layer) to form a photoresist layer; secondly, exposing the photoresist layer with a mask to enable the photoresist layer to form a fully-exposed region and a non-exposed region; thirdly, processing the exposed photoresist layer by the developing process to completely remove the photoresist in the fully-exposed region and retain the photoresist in the non-exposed region; fourthly, etching a region corresponding to the fully-exposed region in the material layer (such as the ITO material layer) through the etching process; and fifthly, peeling off the photoresist in the non-exposed region to obtain a corresponding structure (such as a pixel electrode 36). Although a positive photoresist is taken as the example of the photoresist for illustration herein, for the process of a single patterning process where the photoresist is a negative photoresist, reference can be made to the description in this paragraph, which will not be repeated by the embodiment of the present disclosure herein.

In summary, according to the manufacturing method of the display substrate provided by the embodiment of the present disclosure, in the display substrate, for each of the common electrode lines, the distance between any position point on the target wire segment and the target gate line is less than the distance between the non-target wire segment and the target gate line. The target wire segment is a wire segment where the common electrode line and the data line intersect, and the non-target wire segment is a wire segment on the common electrode line except the target wire segments. Thus, in the display substrate, the distance between the common electrode and the target conductive wire may be longer without changing the area of the common electrode, so that the distance between the common electrode and the intersection (which is the intersection between the common electrode line and the data line) is longer, thereby facilitating implementation of welding work, increasing the success rate in repairing the data line, and leading to a higher aperture ratio of the display substrate. The display substrate manufactured by the method provided by the embodiment of the present disclosure can increase the success rate in repairing the data line while satisfying photoelectric performance of a product, thereby improving a yield of the product.

The followings are embodiments of a repairing method of a display substrate provided by the embodiments of the present disclosure. For the repairing method of the display substrate in the embodiments of the present disclosure and principles thereof, reference can be made to the description in the following embodiments.

FIG. 9 shows a flowchart of a repairing method of a display substrate provided by an embodiment of the present disclosure. The repairing method of the display substrate can be used to repair a broken data line in the display substrate. The present embodiment takes the repair of a broken data line in the display substrate 3 shown in FIG. 3 as an example. Referring to FIG. 9, the method may include the following steps.

In step 901, a first repairing point and a second repairing point are determined according to a breaking point of a first data line when the first data line is broken, wherein the first repairing point is an intersection point between a first common electrode line and the first data line; the second repairing point is an intersection point between a second common electrode line and the first data line; the first common electrode line and the second common electrode line are adjacent and are sequentially arranged along a gate line scanning direction; and the breaking point is located between the first common electrode line and the second common electrode line.

The first data line may be any one of data lines in the display substrate. When the first data line is broken, according to the breaking point of the first data line, an intersection point between a first target wire segment of the first common electrode line and the first data line is determined as the first repairing point; and an intersection point between a first target wire segment of the second common electrode line and the first data line is determined as the second repairing point. The first common electrode line and the second common electrode line are adjacent and are sequentially arranged along a gate line scanning direction; and the breaking point is located between the first common electrode line and the second common electrode line.

Figure 10:
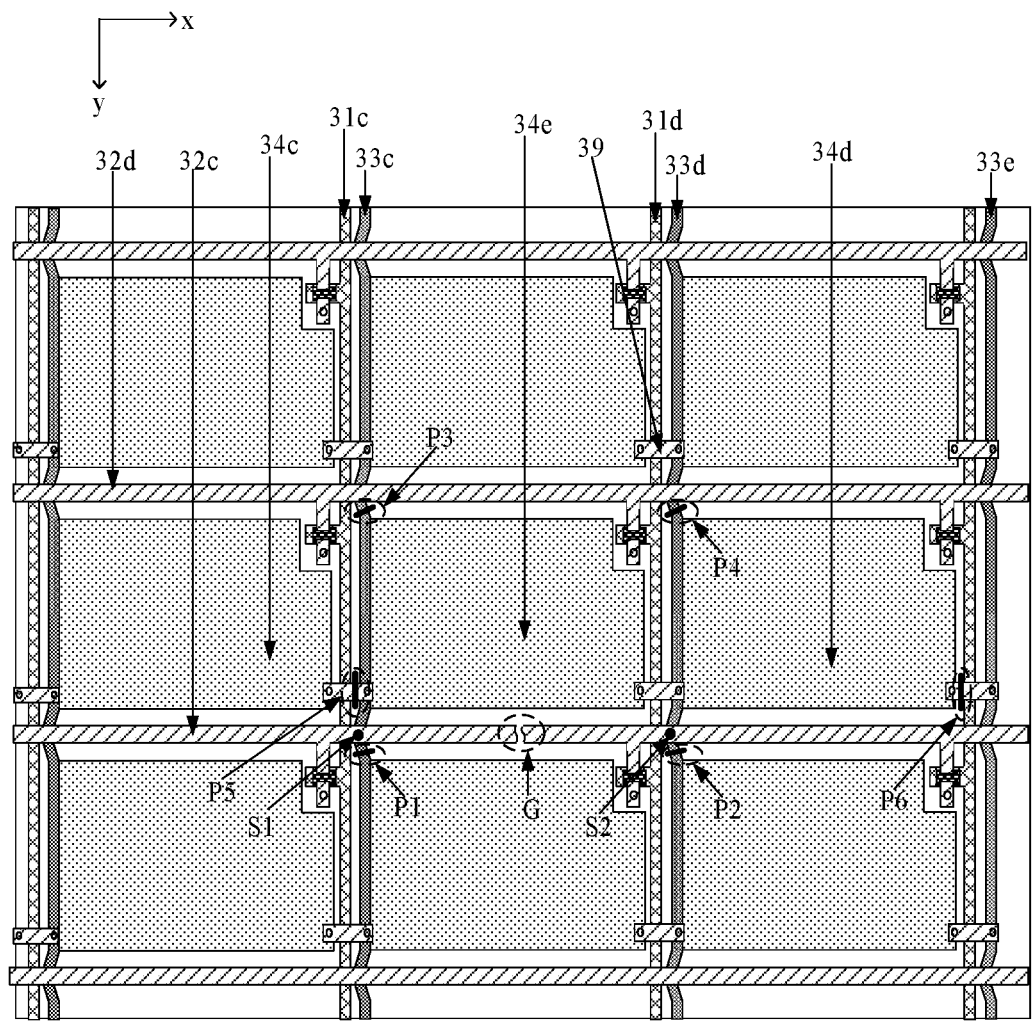
FIG. 10 is a schematic diagram showing the repair of a display substrate provided by an embodiment of the present disclosure.

Exemplarily, FIG. 10 shows a schematic diagram showing repairing of a display substrate provided by an embodiment of the present disclosure. Referring to FIG. 10, the first data line 32*c* is broken, and the breaking point is G. The first common electrode line 33*c* and the second common electrode line 33*d* are adjacent to each other and are sequentially arranged along a gate line scanning direction x; and the breaking point G is located between the first common electrode line 33*c* and the second common electrode line 33*d*. Thus, the intersection point S1 between the first common electrode line 33*c* and the first data line 32*c* is determined as the first repairing point; and the intersection point S2 between the second common electrode line 33*d* and the first data line 32*c* is determined as the second repairing point.

In step 902, a plurality of cutting points are determined according to the first repairing point and the second repairing point, wherein the plurality of cutting points includes: first cutting points on two first target wire segments, second cutting points on two second target wire segments, a third cutting point on a bridging line between the first common electrode line and a first common electrode, and a fourth cutting point on a bridging line between a third common electrode line and a second common electrode; the two first target wire segments are a target wire segment where the first data line and the first common electrode line intersect and a target wire segment where the first data line and the second common electrode line intersect; the two second target wire segments are a target wire segment where a second data line and the first common electrode line intersect and a target wire segment where the second data line and the second common electrode line intersect; the second data line is a previous data line of the first data line; the first common electrode, a third common electrode and the second common electrode are adjacent and are sequentially arranged in the same row along the gate line scanning direction; the third common electrode is located in a pixel area surrounded by a first gate line, a second gate line, the first data line and the second data line; the first gate line is a target gate line corresponding to the first common electrode line; the second gate line is a target gate line corresponding to the second common electrode line; and the second common electrode line and the third common electrode line are adjacent and are sequentially arranged along the gate line scanning direction.

After the first and second repairing points are determined, the plurality of cutting points can be determined according to the first and second repairing points. The plurality of cutting points includes first cutting points, second cutting points, a third cutting point and a fourth cutting point. The first cutting points are located on the two first target wire segments and behind the first data line. The second cutting points are located on the two second target wire segments and behind the second data line. The third cutting point is located on a bridging line between the first common electrode line and the first common electrode. The fourth cutting point is located on a bridging line between the third common electrode line and the second common electrode. The cutting point being located behind the data line means that the cutting point is located in the downstream of the data line along the data line scanning direction. For example, the first cutting points being located on the two first target wire segments and behind the first data line means that the first cutting points are located on the two first target wire segments, and are in a downstream of the first data line along the data line scanning direction; the second cutting points being located on the two second target wire segments and behind the second data line means that the second cutting points are located on the two second target wire segments, and are located in a downstream of the second data line along the data line scanning direction. The previous data line of the first data line refers to the data line located in an upstream of the first data line along the data line scanning direction and adjacent to the first data line.

Exemplarily, continuing referring to FIG. 10, the first common electrode line 33c, the second common electrode line 33d and the third common electrode line 33e are sequentially arranged along the gate line scanning direction x. The second data line 32d is the previous data line of the first data line 32c. The first gate line 31c is a target gate line (namely, the gate line that is most proximal to the first common electrode line 33c) corresponding to the first common electrode line 33c. The second gate line 31d is a target gate line (namely, the gate line that is most proximal to the second common electrode line 33d) corresponding to the second common electrode line 33d. The third common electrode 34e is located in a pixel area surrounded by the first gate line 31c, the second gate line 31d, the first data line 32c and the second data line 32d. The first common electrode 34c, the third common electrode 34e and the second common electrode 34d are sequentially arranged along the gate line scanning direction x. The plurality of cutting points includes: first cutting points P1 and P2 on two first target wire segments (which include a target wire segment where the first common electrode line 33c and the first data line 32c intersect, and a target wire segment where the second common electrode line 33d and the first data line 32c intersect, and which are not shown in FIG. 10), second cutting points P3 and P4 on two second target wire segments (which include a target wire segment where the first common electrode line 33c and the second data line 32d intersect, and a target wire segment where the second common electrode line 33d and the second data line 32d intersect, and which are not shown in FIG. 10), a third cutting point P5 on a bridging line 39 between the first common electrode line 33c and the first common electrode 34c, and a fourth cutting point P6 on a bridging line 39 between the third common electrode line 33e and the second common electrode 34d. The first cutting points P1 and P2 are located behind the first data line 32c along the data line scanning direction y; and the second cutting points P3 and P4 are located behind the second data line 32d along the data line scanning direction y.

In step 903, the first data line is connected to the first common electrode line at the first repairing point, and the first data line is connected to the second common electrode line at the second repairing point.

Optionally, connecting the first data line to the first common electrode line at the first repairing point may include: welding the first data line and the first common electrode line at the first repairing point through a laser welding process. Connecting the first data line to the second common electrode line at the second repairing point may include: welding the first data line and the second common electrode line at the second repairing point through the laser welding process.

As the data line and the common electrode line are distributed at different layers, a film layer between the data line and the common electrode line may be perforated; and the data line and the common electrode line are welded together through the hole on the film layer between the data line and the common electrode line. Optionally, a first welding hole may be formed on a film layer between the first data line and the first common electrode line at the first repairing point; and the first data line and the first common electrode line are welded together at the first welding hole. A second welding hole may be formed on a film layer between the first data line and the second common electrode line at the second repairing point; and the first data line and the second common electrode line are welded together at the second welding hole.

Exemplarily, as shown in FIG. 10, a first welding hole (not shown in FIG. 10) may be formed on the film layer between the first data line 32c and the first common electrode line 33c at the first repairing point S1. The first data line 32c and the first common electrode line 33c are welded at the first welding hole through the laser welding process. A second welding hole (not shown in FIG. 10) may be formed on the film layer between the first data line 32c and the second common electrode line 33d at the second repairing point S2. The first data line 32c and the second common electrode line 33d are welded at the second welding hole through the laser welding process.

In step 904, corresponding common wires are cut at each of the cutting points, and the common wires include the first target wire segments, the second target wire segments and bridging lines.

Optionally, cutting the corresponding common wires at each of the cutting points may include cutting the corresponding common wires at each of the cutting points through the laser cutting process, wherein the common wires refer to the first target wire segments, the second target wire segments and bridging lines connecting the common electrode line and the common electrode (for example, the bridging line 39).

Figure 11:
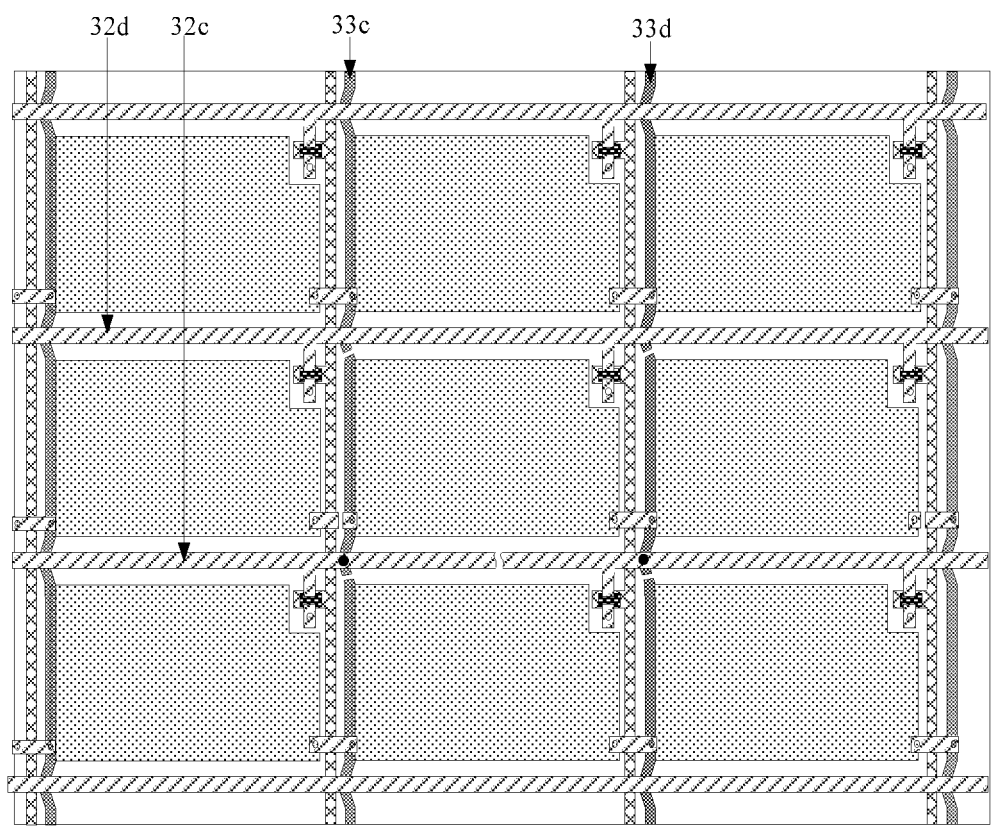
FIG. 11 is a front view of a repaired display substrate provided by an embodiment of the present disclosure.

Exemplarily, as shown in FIG. 10, the corresponding common wires may be cut at each of the cutting points P1 to P6. For example, the first target wire segments are respectively cut at the corresponding first cutting points P1 and P2. The second target wire segments are respectively cut at the corresponding second cutting points P3 and P4. The bridging line 39 between the first common electrode line 33c and the first common electrode 34c is cut at the third cutting point P5. The bridging line 39 between the third common electrode line 33e and the second common electrode 34d is cut at the fourth cutting point P6. For the schematic diagram of the repaired display substrate shown in FIG. 10, reference can be made to FIG. 11. In combination with FIG. 10 and FIG. 11, the data lines of the first repairing point S1 and the second repairing point S2 are welded to the common electrode line; and the common wires corresponding to the cutting points P1 to P6 are cut at each cutting point.

Figure 12:
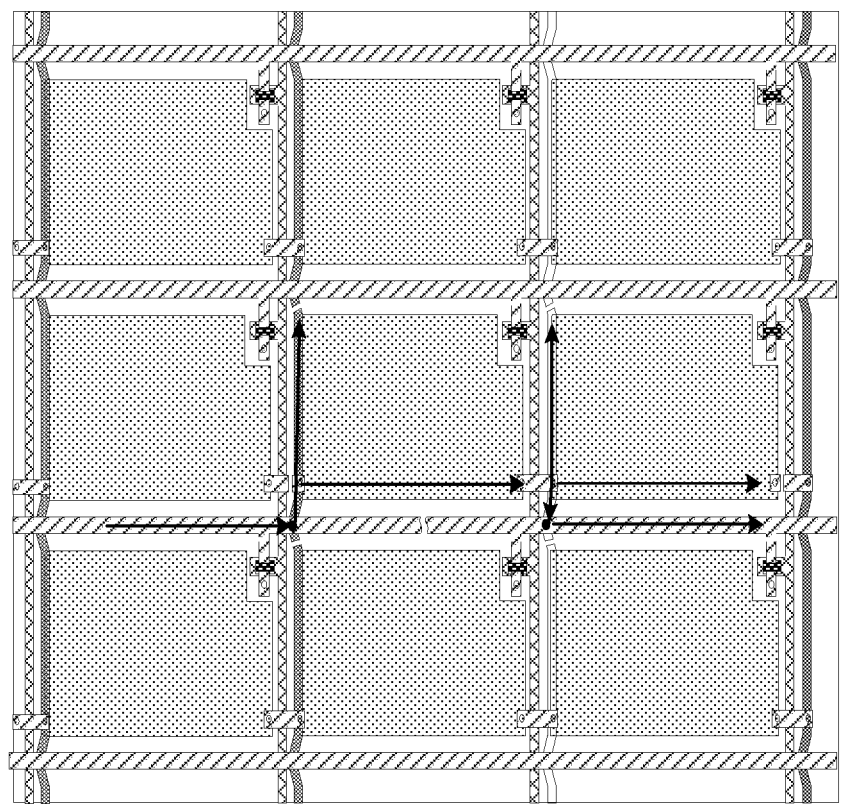
FIG. 12 is a schematic diagram of a transmission path of a signal on a data line after the repair through an embodiment of the present disclosure.

In the embodiment of the present disclosure, after performing the above steps 901 to 904, the repair of the first data line is completed. After the repair of the first data line, when the display substrate is in use, a signal transmitted to the breaking point on the first data line is transmitted from the first repairing point to the first common electrode line, then transmitted to the second repairing point after sequentially passing through the first common electrode line, the third common electrode and the second common electrode line, and finally transmitted back to the first data line from the second repairing point. Exemplarily, FIG. 12 is a schematic diagram of a transmission path of a signal on the first data line 32c after the repair of the display substrate shown in FIG. 10. Bolded arrows indicate the transmission path of the signal on the first data line 32c. Referring to FIG. 12 in combination with FIG. 10, the signal transmitted to the breaking point G on the first data line 32c is transmitted from the first repairing point S1 to the first common electrode line 33c, then transmitted to the second repairing point S2 after sequentially passing through the first common electrode line 33c, the third common electrode 34e and the second common electrode line 33d, and finally transmitted back to the first data line 32c from the second repairing point S2. In this way, the signal on the data line can bypass the breaking point to be transmitted back to the data line, thereby achieving a repairing effect on the data line.

Those skilled in the art can easily understand that the repairing points and the cutting points shown in FIG. 10 are only exemplary, and the repairing points and the cutting points may also be at other positions as long as the signal on the data line can bypass the breaking point to be transmitted back to the data line. However, after the repair, the signal on the data line is actually transmitted through the common electrode line and the common electrode so as to bypass the breaking point. As a result, the signal on the data line may affect signals on the common electrode line and the common electrode, thereby affecting the display of the display substrate. If the repairing points and the cutting points are arranged at other positions, the signal on the data line will have a greater influence on the display of the display substrate. However, if the repairing points and the cutting points are arranged as those shown in FIG. 10, the influence of the signal of the data line on the display substrate can be controlled to a maximum extent. Exemplarily, referring to FIG. 12 in combination with FIG. 10, the signal on the first data line 32c can only affect the display of the pixel areas where the third common electrode 34e and the second common electrode 34d are located, without affecting the display of other pixel areas. Thus, the repair of the first data line 32c may have a limited influence on the display substrate.

In summary, according to the repairing method of the display substrate provided by the embodiment of the present disclosure, in the display substrate, for each of the common electrode lines, the distance between any position point on the target wire segment and the target gate line is less than the distance between the non-target wire segment and the target gate line. The target wire segment is a wire segment where the common electrode line and the data line intersect, and the non-target wire segment is a wire segment on the common electrode line except the target wire segments. Thus, in the display substrate, the distance between the common electrode and the target conductive wire can be longer without changing the area of the common electrode, so that the distance between the common electrode and the intersection (which is the intersection between the common electrode line and the data line) is longer, thereby facilitating implementation of welding work, increasing the success rate in repairing the data line, and leading to a higher aperture ratio of the display substrate.

An embodiment of the present disclosure further provides a display apparatus, including the display substrate 3 provided by the above embodiments. The display apparatus may be a display panel, electronic paper, a mobile phone, a tablet computer, a TV, a display, a notebook computer, a digital photo frame, a navigator, a wearable device or any other product or component having a display function.

In the present disclosure, the terms "first", "second", "third" and "fourth" are for descriptive purposes only and are not to be construed as indicating or implying relative importance. The term "a plurality of" refers to two or more, unless otherwise specifically defined.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A display substrate, comprising:
a base substrate, and a plurality of gate lines, a plurality of data lines, a plurality of common electrode lines and a plurality of common electrodes on the base substrate, wherein
the plurality of gate lines and the plurality of data lines intersect to define a plurality of pixel areas; the plurality of common electrodes are located in the plurality of pixel areas in a one-to-one correspondence; an extending direction of the plurality of grid lines is parallel to an extending direction of the plurality of common electrode lines, the plurality of gate lines and the plurality of common electrode lines are alternately arranged one by one;
each of the common electrode lines comprises a plurality of target wire segments and non-target wire segments, each of the target wire segments is a wire segment where the common electrode line and one data line intersect, and the non-target wire segments are wire segments on the common electrode line except the target wire segments; and for each of the common electrode lines, a distance between any position point on the target wire segment and a target gate line is less than a distance between the non-target wire segment and the target gate line, the target gate line being a gate line that is most proximal to the common electrode line, and common electrodes located on both sides of the target gate line and adjacent to the target gate line are connected to the common electrode line.

2. The display substrate of claim 1, wherein
for each of the common electrode lines, the target wire segment bends in a direction towards the target gate line.

3. The display substrate of claim 1, wherein
the target wire segment is an arc-shaped wire segment.

4. The display substrate of claim 1, wherein
the plurality of common electrodes are arranged in multiple rows along a data line scanning direction; and for each of the common electrode lines, the common electrode line is connected to a target common electrode, and is connected to a common electrode adjacent to and located in the same row as the target common electrode by a bridging line crossing over the target gate line, and the target common electrode and the common electrode line are located in the same pixel area.

5. The display substrate of claim 1, wherein
in two gate lines adjacent to each of the common electrode lines, a distance between one of the gate lines and the common electrode line is less than a distance between the other gate line and the common electrode line.

6. The display substrate of claim 1, further comprising:
a plurality of thin film transistors and a plurality of pixel electrodes, wherein the plurality of thin film transistors and the plurality of pixel electrodes are respectively located in the plurality of pixel areas in a one-to-one correspondence; and the thin film transistor comprises a gate electrode, a source electrode and a drain electrode; the gate electrode is connected to the gate line that is most proximal to the gate electrode; the source electrode is connected to the data line that is most proximal to the source electrode; and the drain electrode is connected to the pixel electrode located in the same pixel area as the thin film transistor.

7. The display substrate of claim 6, wherein
the thin film transistor comprises the gate electrode, a gate insulating layer, an active layer, an interlayer dielectric layer and a source-drain electrode sequentially distributed along a direction away from the base substrate; the source-drain electrode comprises the source electrode and the drain electrode, the source electrode and the drain electrode are not in contact with each other, and are in contact with the active layer, respectively; and
the display substrate further comprises: an insulating layer located between the common electrode and the gate line, and a passivation layer located between the source-drain electrode and the pixel electrode.

8. The display substrate of claim 1, wherein
in two gate lines adjacent to each of the common electrode lines, a distance between one of the gate lines and the common electrode line is less than a distance between the other gate line and the common electrode line; the plurality of common electrodes are arranged in multiple rows along a data line scanning direction; for each of the common electrode lines, the target wire segment is an arc-shaped wire segment bending in a direction towards the target gate line, the common electrode line is connected to a target common electrode, and is connected to a common electrode adjacent to and located in the same row as the target common electrode by a bridging line crossing over the target gate line, and the target common electrode and the common electrode line are located in the same pixel area;
the display substrate further comprises: a plurality of thin film transistors, a plurality of pixel electrodes, an insulating layer and a passivation layer; the plurality of thin film transistors and the plurality of pixel electrodes are respectively located in the plurality of pixel areas in a one-to-one correspondence; the thin film transistor comprises a gate electrode, a gate insulating layer, an active layer, an interlayer dielectric layer and a source-drain electrode sequentially distributed in a direction away from the base substrate; the source-drain electrode comprises a source electrode and a drain electrode; the source electrode and the drain electrode are not in contact with each other, and are in contact with the active layer, respectively; the gate electrode is connected to the gate line that is most proximal to the gate electrode; the source electrode is connected to the data line that is most proximal to the source electrode; the drain electrode is connected to the pixel electrode located in the same pixel area as the thin film transistor; and the insulating layer is located between the common electrode and the gate line, and the passivation layer is located between the source-drain electrode and the pixel electrode.

9. A manufacturing method of a display substrate, the method comprising:
forming a plurality of gate lines, a plurality of data lines, a plurality of common electrode lines and a plurality of common electrodes on a base substrate, wherein
the plurality of gate lines and the plurality of data lines intersect to define a plurality of pixel areas; the plurality of common electrodes are located in the plurality of pixel areas in a one-to-one correspondence; an extending direction of the plurality of gate lines is parallel to an extending direction of the plurality of common electrode lines, the plurality of gate lines and the plurality of common electrode lines are alternately arranged one by one; each of the common electrode lines comprises a plurality of target wire segments and non-target wire segments; each of the target wire segments is a wire segment where the common electrode line and one data line intersect, and the non-target wire segment is a wire segment on the common electrode line except the target wire segments; and for each of the common electrode lines, a distance between any position point on the target wire segment and a target gate line is less than a distance between the non-target wire segment and the target gate line, the target gate line being the gate line that is most proximal to the common electrode line, and common electrodes located on both sides of the target gate line and adjacent to the target gate line are connected to the common electrode line.

10. The method of claim 9, wherein
forming the plurality of gate lines, the plurality of data lines, the plurality of common electrode lines and the plurality of common electrodes on the base substrate comprises:
forming the plurality of common electrodes on the base substrate, wherein the plurality of common electrodes are arranged in multiple columns;
forming the plurality of gate lines and the plurality of common electrode lines on the base substrate on which the common electrodes have been formed, wherein one column of the common electrodes is arranged between every two adjacent gate lines; and
forming the plurality of data lines on the base substrate on which the gate lines and the common electrode lines have been formed, wherein the plurality of data lines and the plurality of target wire segments of each of the common electrode lines intersect one by one.

11. The method of claim 9, wherein
for each of the common electrode lines, the target wire segment bends in a direction towards the target gate line.

12. The method of claim 9, wherein
the plurality of common electrodes are further arranged in multiple rows; and for each of the common electrode lines, the common electrode line is connected to a target common electrode, and is connected to a common electrode adjacent to and located in the same row as the target common electrode by a bridging line crossing over the target gate line, and the target common electrode and the common electrode line are located in the same pixel area.

13. The method of claim 9, wherein
in two gate lines adjacent to each of the common electrode lines, a distance between one of the gate lines and the common electrode line is less than a distance between the other gate line and the common electrode line.

14. The method of claim 9, further comprising:
forming a plurality of thin film transistors and a plurality of pixel electrodes on the base substrate, wherein the plurality of thin film transistors and the plurality of pixel electrodes are respectively located in the plurality of pixel areas in a one-to-one correspondence; and the thin film transistor comprises a gate electrode, a source electrode and a drain electrode; the gate electrode is connected to the gate line that is most proximal to the gate electrode; the source electrode is connected to the data line that is most proximal to the source electrode; and the drain electrode is connected to the pixel electrode located in the same pixel area as the thin film transistor.

15. The method of claim 14, wherein
the thin film transistor comprises the gate electrode, a gate insulating layer, an active layer, an interlayer dielectric layer and a source-drain electrode sequentially distributed along a direction away from the base substrate; the source-drain electrode comprises the source electrode and the drain electrode, the source electrode and the drain electrode are not in contact with each other, and are in contact with the active layer, respectively; and the method further comprises:
forming an insulating layer between the common electrode and the gate line, and
forming a passivation layer between the source-drain electrode and the pixel electrode.

16. A repairing method of a display substrate, wherein the repairing method is for applying to the display substrate of claim 1, and comprises:
determining a first repairing point and a second repairing point according to a breaking point of a first data line when the first data line is broken, wherein the first repairing point is an intersection point between a first common electrode line and the first data line; the second repairing point is an intersection point between a second common electrode line and the first data line; the first common electrode line and the second common electrode line are adjacent and are sequentially arranged along a gate line scanning direction; and the breaking point is located between the first common electrode line and the second common electrode line;
determining a plurality of cutting points according to the first repairing point and the second repairing point, wherein the plurality of cutting points comprises: first cutting points on two first target wire segments, second cutting points on two second target wire segments, a third cutting point on a bridging line between the first common electrode line and a first common electrode, and a fourth cutting point on a bridging line between a third common electrode line and a second common electrode; the two first target wire segments are a target wire segment where the first data line and the first common electrode line intersect and a target wire segment where the first data line and the second common electrode line intersect; the two second target wire segments are a target wire segment where a second data line and the first common electrode line intersect and a target wire segment where the second data line and the second common electrode line intersect; the second data line is a previous data line of the first data line; the first common electrode, a third common electrode and the second common electrode are adjacent and are sequentially arranged in the same row along the gate line scanning direction; the third common electrode is located in a pixel area surrounded by a first gate line, a second gate line, the first data line and the second data line; the first gate line is a target gate line corresponding to the first common electrode line; the second gate line is a target gate line corresponding to the second common electrode line; and the second common electrode line and the third common electrode line are adjacent and are sequentially arranged along the gate line scanning direction;
connecting the first data line to the first common electrode line at the first repairing point, and connecting the first data line to the second common electrode line at the second repairing point; and
cutting corresponding common wires at each of the cutting points, the common wire comprising the first target wire segments, the second target wire segments and the bridging lines.

17. The method of claim 16, wherein
the first cutting points are located on the two first target wire segments and behind the first data line;
the second cutting points are located on the two second target wire segments and behind the second data line;
the third cutting point is located on a bridging line between the first common electrode line and the first common electrode; and
the fourth cutting point is located on a bridging line between the third common electrode line and the second common electrode.

18. The method of claim 16, wherein
connecting the first data line to the first common electrode line at the first repairing point comprises:
welding the first data line and the first common electrode line at the first repairing point through a laser welding process; and
connecting the first data line to the second common electrode line at the second repairing point comprises:
welding the first data line and the second common electrode line at the second repairing point through the laser welding process.

19. The method of claim 16, wherein
cutting the corresponding common wires at each of the cutting points comprises:
cutting the corresponding common wires at each of the cutting points through a laser cutting process.

20. A display apparatus, comprising: the display substrate of claim 1.

* * * * *